P. G. GARDINER.
Carriage-Spring.
No. 981.
Reissued June 12, 1860.
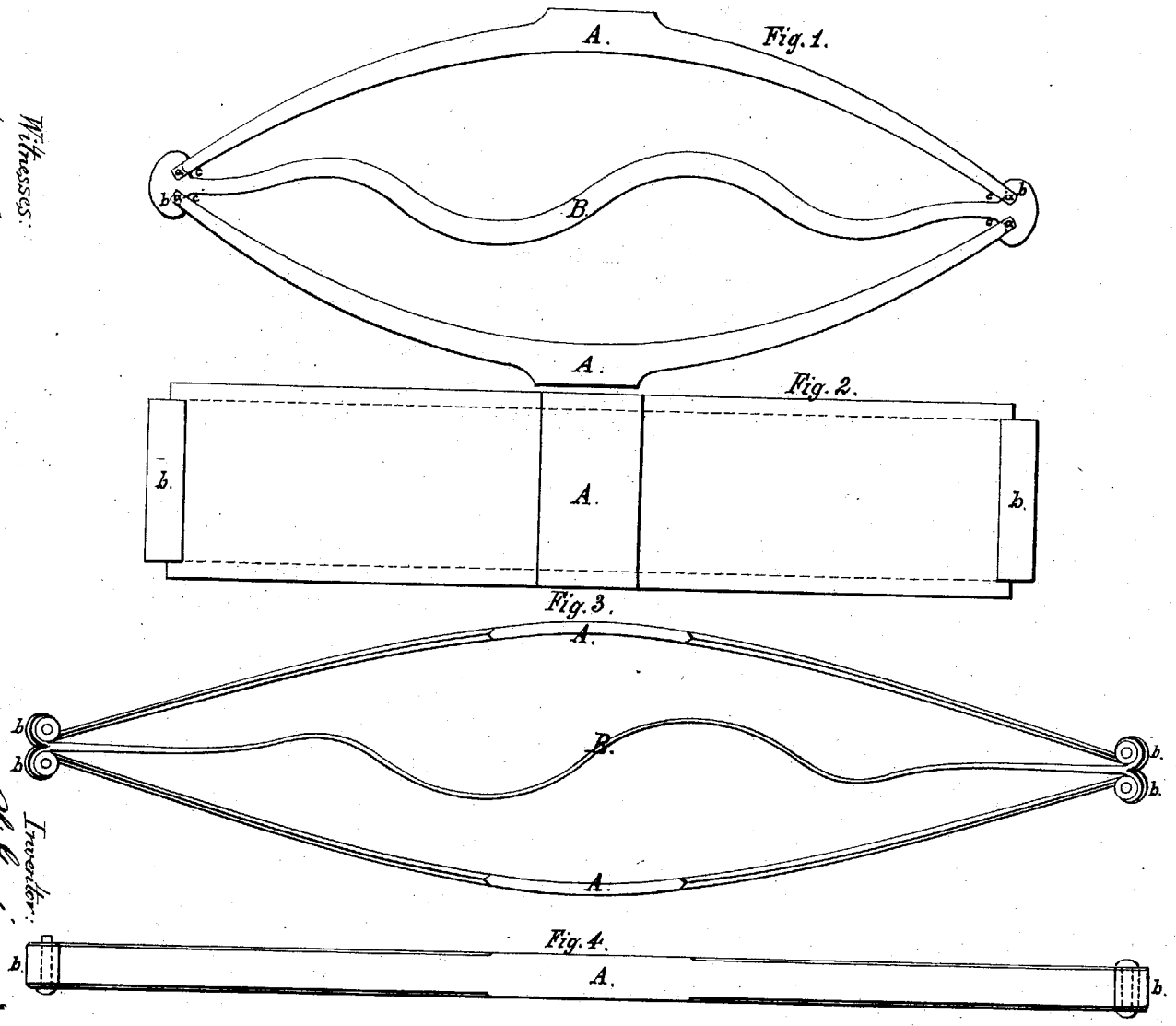
Witnesses:
B. Staples
Geo. W. Fox
Inventor:
P. G. Gardiner.
AM. PHOTO-LITHO. CO. N.Y. (OSBORNE'S PROCESS.)

UNITED STATES PATENT OFFICE.

PERRY G. GARDINER, OF NEW YORK, N. Y.

IMPROVEMENT IN SPRINGS FOR RAILROAD-CARS AND CARRIAGES.

Specification forming part of Letters Patent No. 23,766, dated April 26, 1859; Reissue No. 981, dated June 12, 1860.

*To all whom it may concern:*

Whereas I, PERRY G. GARDINER, of the city, county, and State of New York, mechanical engineer, did obtain Letters Patent of the United States, bearing date the 26th day of April, 1859, for an Improvement in Springs for Railroad-Cars and Carriages; and whereas I believe the same are inoperative and invalid by reason of a defective specification, which defect has arisen from inadvertence and mistake: now, be it known that, for the purpose of a surrender and reissue of said Letters Patent pursuant to the acts of Congress in such case made and provided, I do hereby declare the following to be an amended specification, and a full and exact description of my said invention, reference being had to the drawings accompanying and making part of this my said specification, and to the letters of reference therein.

Figure I is a side view or elevation of the spring as adapted more especially for railroad-cars. Fig. II is a surface view or plan of the same. Fig. III is a side view or elevation of the spring as adapted to road-carriages, wagons, and vehicles; Fig. IV, a surface view or plan of the same.

In all the figures the same letters represent the same parts.

The nature of my invention consists primarily in combining and arranging two single blades or plates of steel bent into equal elongated curves, so as when put together to form an elliptical shape, with a third plate or blade intermediate of the other two and united with them at the ends, so as to act under pressure in the way of tension of the metal through curves or corrugations in the intermediate plate of more or less radius as greater or less softness of action is required in the spring; and my invention secondarily consists in connecting the two blades and tension-bar aforesaid together at their ends in certain cases without the use of bolts, pins, rivets, or hinges.

The general form and construction of the springs is shown in the drawings at Figs. I and II. Fig. I represents the construction of the spring more especially adapted to railroad-cars when great strength and elastic power with less motion is requisite, and Fig. III representing the construction of the springs for road-carriages and vehicles where much less strength is required, and the action or motion of the spring is much greater and the spring much softer, lighter, and less rigid.

In either form of the spring I believe that it possesses the elements of strength, elasticity, and permanence, with less weight of metal, beyond any steel spring heretofore in use.

I construct the spring as follows: In Fig. I the two exterior blades A A are of equal size and shape, and are made somewhat thickest in the middle and have a gradual and even taper from the middle toward the ends. At the four corners of each of the plates, upon the exterior edges, there are flattened knobs or buttons *a a*, for the purpose of holding the plates in their places or bearings, as hereinafter described. The exterior ends of the plates are rounded off so as to have a smooth curved surface.

The intermediate plate or tension-bar, B, is a steel plate bent between the ends into a series of easy curves or corrugations, the ends having knobs *b b*, so as to form strong bearings for the two exterior plates A A. Upon the inner faces of these knobs are sunk straight grooves *c c*, to receive the ends of the exterior plates and hold them in place. Upon the intermediate tension-bar and its construction must chiefly depend the strength, softness, degree of motion, and elastic power and quality of the spring, and it is peculiar to this spring that its strength (within reasonable limits) does not depend merely upon the quantity of metal used, but upon the sharpness of the curves or angles in the tension-plate and their number. If the corrugations or curves are short and numerous, the spring will be proportionately stiff and rigid, and have less play or action. If the curves are long and easy, and few, the spring will consequently be softer, more sensitive, and have a greater amount of motion or elastic action, it being understood that there must always be a due relation between the exterior blades and the intermediate tension-plate as regards size and proportions. Therefore, in springs intended for railroad-cars the corrugations in the intermediate plate are more frequent and shorter than in carriage-springs for common roads, and as the play or motion in the spring is less in railroad-cars, the ends of the exterior blades may safely and conveniently have their bearings in the grooves *c c*, without the necessity of bolts, pins, rivets, or hinges.

The exterior blades are to be made of such a length that when bent into the elliptical form and inserted into the grooves *c c* of the intermediate plate they will exert a sufficient amount of tension upon the tension-plate to be held securely in their places.

The spring thus constructed, when under pressure, acts to a very great degree by compression upon the grain of the metal in the exterior blades, while the strain upon the intermediate plate being longitudinal, it yields only to the straightening of its curves, and will not break except under a force nearly powerful enough to tear the metal asunder. When the exterior blades are brought down under pressure so as to flatten or elongate the ellipse, their softness of action increases by the change of position, while at the same time the tension-bar exerts its strength in an increasing ratio as the pressure increases in the direction of a straight pull upon the metal from end to end, thereby rallying in strength or resisting capacity as the weight tells upon the spring.

For road-carriages the construction of the spring is the same in principle, but modified in detail so as to give to the intermediate plate fewer curves, and these of longer radius, so as to render its action softer and more sensitive, and so as to allow more motion in the spring. The form is seen in Fig. III. The ends of the blades must be secured so as to allow increased motion required and not come apart. The ends may be secured by a clasp, or clip, or by rivet, or screw and nut. In the drawings, Fig. III, is shown a spring having the ends of the tension-plate forked and turned over in opposite directions, the ends of the exterior blades being turned up in a corresponding manner and inserted within the coils of the end of the tension-bar, so as to form a socket-joint. A pin or bolt passing through, with a head at one end and a screw or upset at the other, fastens the parts together, or they may be hinged together. In this spring the tension-bar or plate may be split, or otherwise varied in form so as to give lightness and grace to the appearance of the spring. This form of spring for road-carriages combines greater strength with lightness of material and weight than any form of carriage-spring heretofore known and used.

I am aware that elliptical and other springs have been constructed with intermediate or auxiliary supporting-springs; and I am aware of the application of an intermediate plate, curved somewhat similar to the figure of an ogee, to the ordinary elliptical spring having been patented by David A. Edwards, under date of November 16, 1841; but in all these cases the intermediate springs were simply additional or mere supporters, as in the case of Edwards particularly, when the intermediate spring simply lies between the two elliptical blades and acts simply by being flattened out, without any tension whatever from end to end. I, therefore, do not claim as my invention the inserting an auxiliary supporting-spring between the elliptical blades; but What I do claim as my invention is—

1. The combining and arranging two blades bent elliptically with an intermediate plate curved or corrugated so that the intermediate plate acts only by tension or strain apart from end to end, in the manner and for the purposes described.

2. The manner described of securing together the elliptical blades and tension-bar at the ends without rivets, pins, bolts, hinges, or screws.

P. G. GARDINER.

Witnesses:

J. B. STAPLES,

GEORGE W. FOX.